United States Patent
Lysenko et al.

(10) Patent No.: US 7,960,444 B2
(45) Date of Patent: Jun. 14, 2011

(54) VEGETABLE OIL BASED POLYOLS AND POLYURETHANES MADE THEREFROM

(75) Inventors: Zenon Lysenko, Midland, MI (US); Alan K. Schrock, Lake Jackson, TX (US); David A. Babb, Lake Jackson, TX (US); Aaron Sanders, Missouri City, TX (US); John Tsavalas, Midland, MI (US); H. Ray Jouett, Houston, TX (US); Larry Chambers, Houston, TX (US); Charles Keillor, Lake Jackson, TX (US); James H. Gilchrist, Dunbar, WV (US)

(73) Assignee: Dow Global Technologies LLC, Midland, MI (US)

( * ) Notice: Subject to any disclaimer, the term of this patent is extended or adjusted under 35 U.S.C. 154(b) by 129 days.

(21) Appl. No.: 10/553,767

(22) PCT Filed: Apr. 21, 2004

(86) PCT No.: PCT/US2004/012427
§ 371 (c)(1),
(2), (4) Date: Oct. 19, 2005

(87) PCT Pub. No.: WO2004/096882
PCT Pub. Date: Nov. 11, 2004

(65) Prior Publication Data
US 2006/0276609 A1 Dec. 7, 2006

(51) Int. Cl.
*C08G 18/00* (2006.01)
*C08G 18/04* (2006.01)
*C07C 57/02* (2006.01)

(52) U.S. Cl. ............... 521/172; 528/44; 554/1

(58) Field of Classification Search .......... 521/172, 521/170; 528/44, 1; 525/7
See application file for complete search history.

(56) References Cited

U.S. PATENT DOCUMENTS

| | | | |
|---|---|---|---|
| 4,216,344 | A | 8/1980 | Rogier |
| 4,423,162 | A | 12/1983 | Peerman et al. |
| 4,496,487 | A | 1/1985 | Peerman et al. |
| 4,534,907 | A | 8/1985 | Peerman et al. |
| 4,543,369 | A | 9/1985 | Peerman et al. |
| 6,107,433 | A | 8/2000 | Petrovic et al. |
| 6,180,686 | B1 | 1/2001 | Kurth |

FOREIGN PATENT DOCUMENTS

| | | |
|---|---|---|
| CA | 2162083 | 5/1996 |
| EP | 0106491 A2 | 4/1984 |

OTHER PUBLICATIONS

Petrović et al. (Sturcture and Properteis of Polyurethane Based on Halogenated and Nonhalogenated Soy-Polyols, J. Polym. Sci., Part A: Polym. Chem, 2000, 38, 4062-4069).*
T.H. Khoe, F.H. Otey and E.N. Frankei, "Rigid Urethane Foams from Hydroxymethylated Linseed Oil and Polyol Esters", Northern Regional Research Laboratory, Peoria, Illinois 61604 USA, (1972).
Journal of Polymers and the Environment (2002), 10(1/2), 49-52. "Polyols and Polyurethanes from Hydroformylation of Soybean Oil." Guo, Andrew; Demydov, Dima; Zhang, Wei; Petrovic, Zoran S. Kansas Polymer Research Center, Business and Technology Institute, Pittsburg, KS, USA. Publisher: Kluwer Academic/Plenum Publishers.

* cited by examiner

*Primary Examiner* — Mark Eashoo
*Assistant Examiner* — Peter F Godenschwager

(57) ABSTRACT

Polyols useful in the manufacture of polyurethanes are disclosed. The polyols are prepared by reacting a vegetable oil based (hydroxymethyl containing) monomer with a polyol, polyamine or aminoalcohol under vacuum.

17 Claims, No Drawings

VEGETABLE OIL BASED POLYOLS AND POLYURETHANES MADE THEREFROM

FIELD OF THE INVENTION

The invention relates to improved methods of making vegetable based polyols to make, for example, polyurethane foams.

BACKGROUND OF THE INVENTION

Polyurethanes are produced by the reaction of polyisocyanates and polyols. The first large scale commercial production of polyurethanes arose using polyester polyols from the ester condensation reaction of diols or polyols and dicarboxylic acids to make flexible foams. The polyester polyols were supplanted by polyether polyols because of lower cost and ability to make a wide range of polyols. Polyethers are made by polymerizing epoxides (oxiranes) derived from petroleum feedstocks with active hydrogen starting compounds (polyols and polyamines).

Rigid polyurethane foams have been made with castor oil or castor oil byproducts. Castor oil has been used in rigid foams because of its low molecular weight (short chain length) and high functionality (trihydroxyl).

Attempts have been made to make polyols from vegetable or renewable feedstocks such as those disclosed by Peerman et al., U.S. Pat. Nos. 4,423,162; 4,496,487 and 4,543,369. Peerman et al. describe a method reacting a hydroxyester monomer with a polyol or polyamine. However, Peerman et al., specifically describe problems of gelling, which can be avoided by limiting the extent of conversion or by using quantities of reactants far from the amounts required stoichiometrically. Consequently, Peerman et al., only describe elastomers (crosslinked rigid polyurethanes) from their resultant polyols. In addition, the presence of secondary hydroxyls were described as causing sweating, wherein the product appears to be wet and not fully cured, thus limiting the use of low cost renewable initiators such as glycerol.

Accordingly, it would be desirable to provide both a formation method and a vegetable based polyol that solves one or more of the problems of the prior art, such as one of those described above. In particular it would be desirable to provide a vegetable oil based (VOB) polyol that can be used to make flexible polyurethane foams in the absence of any other polyols.

SUMMARY OF THE INVENTION

A first aspect of the invention is a process to make a vegetable oil based polyol, the process comprising,
i) mixing an initiator that is a polyol, polyamine, aminoalcohol or mixture thereof and a vegetable oil based (VOB) monomer having at least one of the formulae:

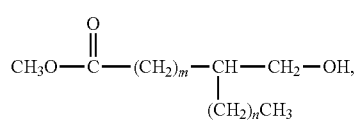

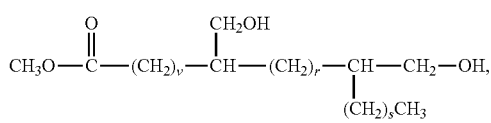

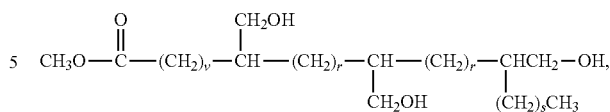

where m, n, v, r, and s are integers and m is greater than 3, n greater than or equal to zero and m+n is from 11 to 19, v is greater than 3, r is greater than or equal to zero, s is greater than or equal to zero and v+r+s is from 10 to 18, and ii) heating the mixture to a reaction temperature, for a reaction time, while under a vacuum and in the presence of an amount of catalyst sufficient to form the vegetable oil based polyol. It is understood that the initiator fails to contain an ester group that can transesterify under the reaction conditions.

The method of the first aspect surprisingly may form a non-gelled polyol with sufficient hydroxyl functionality and molecular weight to form a flexible foam when reacted with a polyisocyanate. The process even though performed under vacuum may use initiators that would volatilize off relative quickly at the reaction temperature used to form the VOB polyol. The process, surprisingly, makes novel non-gelled VOB polyols even when VOB monomers are present that have three hydroxyl groups. Finally, it has been surprisingly found that the process forms a unique VOB polyol, where all of the VOB monomer is reacted, but within the polyol there are some hydroxyl or amine groups of the initiator that have not been reacted even though the amount of VOB monomer is far in excess of the stoichiometric amount needed to react therewith.

A second aspect of the invention is a process to make a vegetable based polyol, the process comprising,
i) heating, in the presence of a catalyst a vegetable oil based monomer having at least one of the formulae:

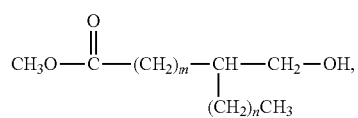

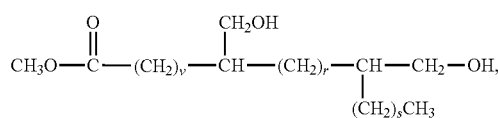

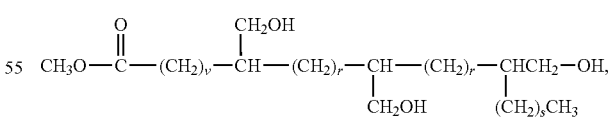

where m, n, v, r, and s are integers and m is greater than 3, n greater than or equal to zero and m+n is from 11 to 19, v is greater than 3, r is greater than or equal to zero, s is greater than or equal to zero and v+r+s is from 10 to 18 until some portion of the VOB monomers have reacted and subsequently ii) introducing an initiator that is a polyol, polyamine, aminoalcohol or mixture thereof to the reacted VOB monomers of step (i) for a time and temperature, under vacuum, sufficient to form the vegetable based polyol. This aspect of the invention has been found to surprisingly make similar VOB polyols even though the initiator is added after the VOB monomers have, for example, built substantial molecular weight. The method is believed to give improved control over the resultant molecular weight of the VOB polyol that is formed.

A third aspect of the invention is a vegetable oil based polyol comprised of

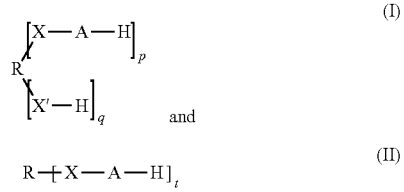

where R is a residue of a polyol, polyamine or aminoalcohol initiator; X and X' may the same or different and is O, N or NH; p is an integer from 1 to 5; q is an integer from 1 to 5 wherein p+q is from 3 to 8, t is an integer from 3 to 8 and A may be the same or different and is selected from the group consisting of A1, A2 and A3 where

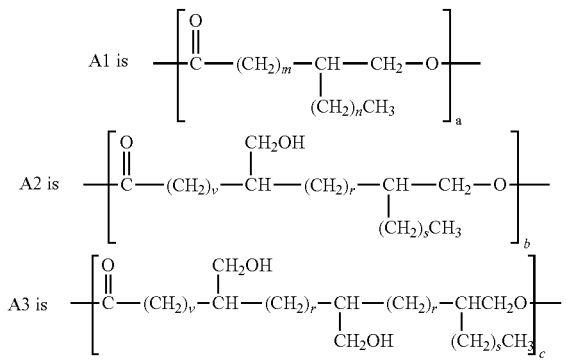

where m, n, v, r, s, a, b and c are integers and m is greater than 3, n greater than or equal to zero and m+n is from 11 to 19, v is greater than 3, r is greater than or equal to zero, s is greater than or equal to zero and v+r+s is from 10 to 18, a is from 0 to 35, b is from 0 to 35 and c is from 0 to 35, so long as that all a's, b's and c's in any molecule of the vegetable oil based polyol are not all zero and (a+b+c)/(p+q+t) is about 5 to about 100 in the vegetable oil based polyol. It is understood that each or all of the hydroxyls may react with the methyl ester of another VOB monomer. As such, it is understood that the structures shown above merely model the actual degree of reaction (i.e., one VOB monomer hydroxyl reacted). However, any or all of the available hydroxyl groups are capable of reacting under the conditions of the polymerization. That is to say, the growth of the chain may occur not only at the hydroxyl site depicted in the above structures, but, at any of the hydroxyls of the VOB monomer. It is also conceivable that more than one of the available hydroxyl groups of the VOB monomer may be acylated.

A fourth aspect of the invention is a vegetable oil based polyol comprised of

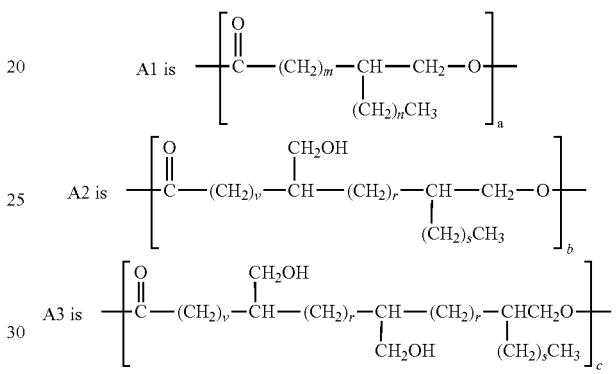

where R is a residue of a polyol, polyamine or aminoalcohol initiator; X and X' may be the same or different and is O, N or NH; p is an integer from 1 to 5; q is an integer from 1 to 5 wherein p+q is from 2 to 8, t is an integer from 2 to 8 and A may be the same or different and is selected from the group consisting of A1, A2 and A3 where

where m, n, v, r, s, a, b and C are integers and m is greater than 3, n greater than or equal to zero and m+n is from 11 to 19, v is greater than 3, r is greater than or equal to zero, s is greater than or equal to zero and v+r+s is from 10 to 18, a is from 0 to 35, b is from 0 to 35 and c is from 0 to 35, so long as that all a's, b's and c's are essentially not all zero, at least a portion of A is A3 and (a+b+c)/(p+q+t) is greater than 0 to about 100 in the vegetable oil based polyol.

The vegetable oil based polyols may be used in any applications that polyols are used. Examples include polyurethane applications of all types such as elastomers, coatings, adhesives, sealants, rigid foams and in particular flexible foams.

DETAILED DESCRIPTION OF THE INVENTION

The vegetable based polyols of the present invention are made by reacting an initiator with a vegetable oil based (VOB) monomer. The initiator has at least one active hydrogen, which are reacted with the VOB monomer. The initiator may be depicted by the formula:

R(XH)$_p$

Where X is O, N, or NH and p is 1 to 8. In the formula, X may be the same or different. The initiator therefore encompasses polyols, polyamines and aminoalcohols. R generally represents a linear, cyclic chain or combination thereof of alkane (C—C), alkene (C=C), ether (C—O—C) linkages or combinations thereof. The carbons within the aforementioned chain may be substituted with a methyl or ethyl group. Generally the molecular weight of the initiator is at most from 32 to about 2000. Preferably, the molecular weight is at least about 50, more preferably at least about 60, most preferably at least about 90 to preferably at most about 1400, more preferably at most about 1200 and most preferably at most about 800.

Exemplary polyol initiators include neopentylglycol; 1,2-propylene glycol; trimethylolpropane; pentaerythritol; sorbitol; sucrose; glycerol; alkanediols such as 1,6-hexanediol; 2,5-hexanediol; 1,4-butanediol; 1,4-cyclohexane diol; ethylene glycol; diethylene glycol; triethylene glycol; 9(1)-hydroxymethyloctadecanol, 1,4-bishydroxymethylcyclohexane; 8,8-bis(hydroxymethyl)tricyclo[5,2,1,0$^{2,6}$]decene; Dimerol alcohol (36 carbon diol available from Henkel Corporation); hydrogenated bisphenol; 9,9(10,10)-bishydroxymethyloctadecanol; 1,2,6-hexanetriol; any of the aforementioned where at least one of the alcohol or amine groups present therein has been reacted with ethylene oxide, propylene oxide or mixture thereof; and combination thereof.

Any of the aforementioned where at least one of the alcohol groups present therein has been reacted with ethylene oxide or propylene oxide means the active hydrogen of the hydroxyl reacts to form a polyether polyol exemplified by the following formula:

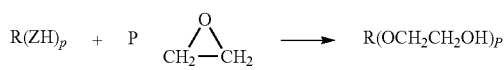

where R is the same as defined above. It is also understood that the other alkoxylating agents instead of ethylene oxide or propylene oxide may be. Amine groups may also be reacted with the alkoxylating agent.

Exemplary polyamine initiators include ethylene diamine; neopentyldiamine, 1,6-diaminohexane; bisaminomethyltricyclodecane; bisaminocyclohexane; diethylene triamine; bis-3-aminopropyl methylamine; and triethylene tetramine.

Exemplary aminoalcohols include ethanolamine, diethanolamine, and triethanolamine.

Other useful initiators that may be used include polyols, polyamines or aminoalcohols described in U.S. Pat. Nos. 4,216,344; 4,243,818 and 4,348,543 and British Pat. No. 1,043,507.

Preferably, the initiator is selected from the group consisting of neopentylglycol; trimethylolpropane; pentaerythritol; sorbitol; sucrose; glycerol; 1,2-propylene glycol; 1,6-hexanediol; 2,5-hexanediol; 1,6-hexanediol; 1,4-cyclohexane diol; 1,4-butanediol; ethylene glycol; diethylene glycol; triethylene glycol; bis-3-aminopropyl methylamine; ethylene diamine; diethylene triamine; 9(1)-hydroxymethyloctadecanol; 1,4-bishydroxymethylcyclohexane; 8,8-bis(hydroxymethyl)tricyclo[5,2,1,0$^{2,6}$]decene; Dimerol alcohol; hydrogenated bisphenol; 9,9(10,10)-bishydroxymethyloctadecanol; 1,2,6-hexanetriol; any of the aforementioned where at least one of the alcohol or amine groups present therein has been reacted with ethylene oxide, propylene oxide or mixture thereof; and combination thereof.

More preferably the initiator is selected from the group consisting of neopentylglycol; 1,2-propylene glycol; trimethylolpropane; pentaerythritol; ethoxylated pentaerythritol; propoxylated pentaerythritol; sorbitol; sucrose; glycerol; ethoxylated glycerol; propoxylated glycerol; diethanolamine; alkanediols such as 1,6-hexanediol, 1,4-butanediol; 1,4-cyclohexane diol; 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis(hydroxymethyl)tricyclo[5,2,1,0$^{2,6}$]decene; Dimerol alcohol; hydrogenated bisphenol; 9,9(10,10)-bishydroxymethyloctadecanol; 1,2,6-hexanetriol and combination thereof.

Even more preferably the initiator is selected from the group consisting of glycerol; ethylene glycol; 1,2-propylene glycol; trimethylolpropane; ethylene diamine; pentaerythritol; diethylene triamine; sorbitol; sucrose; or any of the aforementioned where at least one of the alcohol or amine groups present therein has been reacted with ethylene oxide, propylene oxide or mixture thereof; and combination thereof.

Most preferably the initiator is glycerol, pentaerythritol, sucrose, sorbitol, an ethoxylated glycerol, propyxylated glycerol, ethoxylated pentaerthritol, propyxylated pentaerthritol or mixture thereof.

Surprisingly, using the method of the present invention, it is preferred that an initiator is used that has at least one secondary hydroxyl or secondary amine (e.g., glycerol). It is surprising, because the reaction may cause the VOB monomer to react, for example with glycerol, in such a way that the resultant vegetable oil based polyol has at least some polyol molecules where at least one of the primary hydroxyls of the glycerol has not reacted with the VOB monomer, but the secondary-hydroxyl has. This is further described below.

The VOB monomer is a vegetable oil based monomer having at least one of the formulae:

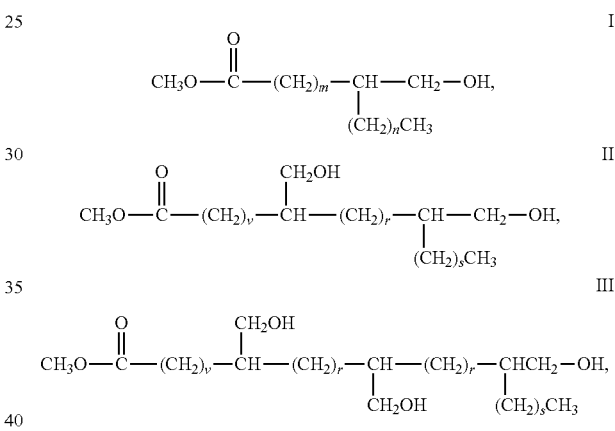

where m, n, v, r, and s are integers and m is greater than 3, n greater than or equal to zero and m+n is from 11 to 19, v is greater than 3, r is greater than or equal to zero, s is greater than or equal to zero and v+r+s is from 10 to 18.

The VOB monomer may be of any animal fat or vegetable oil that is comprised of triglycerides that upon saponification with a base such as aqueous sodium hydroxide yields a fatty acid and glycerol, where at least a portion of the fatty acids are unsaturated fatty acids (i.e., contain at least one carbon double bond). Preferred vegetable oils are those that yield at least about 70 percent unsaturated fatty acids by weight. More preferably, the vegetable oil yields at least about 85 percent, more preferably at least 87 percent, and most preferably at least about 90 percent by weight unsaturated fatty acids. It is understood that specific fatty acids derived from a vegetable oil, animal fat or any other source may be used. That is to say, for example, palmitoleic, oleic, linoleic, linolenic and arachidonic fatty acid alkyl esters may be used to form the VOB monomer directly. It is preferred, however, to use a vegetable oil as previously described. Preferred vegetable oils include, for example, soy, safflower, cotton, linseed, peanut, olive, sunflower, canola, rapeseed, corn, palm oil or combination thereof. More preferably, the vegetable oil is a soy, sunflower, canola, corn, rapeseed oil, or combination thereof. Most preferably, the vegetable oil is soy, sunflower, canola oil or combination thereof. It is understood that the vegetable oil may be obtained from a genetically modified organism, such as genetically modified soybean, sunflower or canola.

The unsaturated fatty acid alkyl esters then may be formed, by any suitable process such as those known in the art, into the VOB monomer (hydroxymethylesters). For example, the hydroxymethyl group may be introduced by a hydroformylation process using a cobalt or rhodium catalyst followed by the hydrogenation of the formyl group to obtain the hydroxymethyl group by catalytic or by chemical reduction. Procedures to form the hydroxymethylesters are described in U.S. Pat. Nos. 4,216,343; 4,216,344; 4,304,945 and 4,229,562 and in particular 4,083,816. Other known processes to form hydroxymethylesters from fatty acids may also be used such as described by U.S. Pat. Nos. 2,332,849 and 3,787,459.

In forming the VOB monomers, the formylated fatty acid alkyl esters may be completely formylated or only partially formylated. That is to say, the fatty acid alkyl esters of the particular vegetable oil may have some remaining unsaturated (C=C) bonds. Preferably, however, the amount of unsaturated bonds remaining after formylation is as described in concurrently filed application titled "ALDEHYDE AND ALCOHOL COMPOSITIONS DERIVED FROM SEED OILS," having inventors Donald Morrison et al., and U.S. Provisional Application No. 60/465,663, filed Apr. 25, 2003 and concurrently filed non-provisional application claiming priority therefrom, incorporated herein by reference. After the fatty acid alkyl esters are formylated they are hydrogenated, such that there is desirably essentially no remaining unsaturated bonds (i.e., trace amounts at most and preferably no detectable amounts of unsaturation).

The VOB monomer and the initiator are mixed or blended together by any suitable means such as those known in the art. For example, simple stirring is sufficient.

The resulting VOB monomer composition may include a mixture of hydroxymethyl-substituted fatty acids or fatty acid esters comprising in terms of hydroxy distribution from greater than about 10, preferably greater than about 25, to less than about 95 percent monoalcohol, {that is, mono(hydroxymethyl)}, from greater than about 1 to less than about 65 percent diol {that is, di(hydroxymethyl)}, and from greater than about 0.1 to less than about 10 percent triol {that is, tri(hydroxymethyl)}, by weight, based on the total weight of the composition. Furthermore, the ratio of the diol to triol may be greater than 5/1.

The VOB monomer and initiator are heated to a reaction temperature, for a reaction time, while under a vacuum and in the presence of an amount of a catalyst sufficient to form the vegetable based polyol. The reaction temperature that is employed is, for example, a function of the VOB monomer, initiator and catalyst, but the reaction temperature is generally at least about 140° C. to about 300° C. when using a tin or titanium catalyst. Preferably, the reaction temperature is at least about 150° C., more preferably at least about 180° C., most preferably at least about 190° C. to preferably at most about 250° C., more preferably at most about 220° C. and most preferably at most about 210° C.

The catalyst may be any suitable catalyst such as a tin, titanium, enzyme catalyst (e.g., lipase), carbonate catalyst (e.g., $K_2CO_3$, $NaHCO_3$) or combination thereof.

In a preferred embodiment, the catalyst is an enzyme catalyst, such as lipase, which allows the reaction temperature to be below about 100° C. to about room temperature. This in turn allows the use of initiators (e.g., sugar) that would be degraded by the higher temperatures using tin or titanium catalysts.

The reaction time, similarly, is dependent on the variables described above for the reaction temperature. Generally, the time is at least about 10 minutes to at most about 24 hours. Preferably, the reaction time is at least about 15 minutes, more preferably at least about 30 minutes, more preferably at least about 1 hour to preferably at most about 12 hours, more preferably at most about 9 hours and most preferably at most about 5 hours.

To form the VOB polyol, it has been found that it is critical that the reaction be carried out under a vacuum. This is even true where the initiator is volatile at the reaction temperature. Volatile means that the initiator will volatilize off entirely in substantially less time than the total reaction time under the vacuum. For example, when the initiator is glycerol, the glycerol in the reaction vessel minus the VOB monomer would be volatilized off under a vacuum of about 20 torr in about 120 minutes at 200° C. Generally, the vacuum is at least about 100 torr. Preferably the vacuum is at least about 50 torr, more preferably the vacuum is at least about 20 torr.

In a preferred embodiment, particularly when using a volatile initiator, the VOB is placed in the reactor under vacuum at the reaction temperature for a period of time sufficient to transesterify a substantial amount of the VOB monomer (e.g., at least about 10 percent of the ester groups of the VOB monomer have undergone transesterification) and subsequently the initiator is added to form the VOB polyol. This method allows for precise control of the molecular weight without substantial loss of a volatile initiator.

The amount of catalyst has also been found to be critical when using a tin or titanium catalyst solely. This is particularly true when the initiator is volatile as described previously. The amount of catalyst must be some minimum amount to effect the reaction between the initiator and VOB monomer sufficiently quickly to realize the VOB polyol. The amount of catalyst depends, for example, on the particular type of catalyst, VOB monomer, and initiator.

Generally, when a tin catalyst is employed, the amount of catalyst is at least about 100 ppm to at most about 2500 ppm by weight of tin to the total reaction mixture. Preferably, the amount of tin catalyst is at least about 250 ppm, more preferably at least about 500 ppm and most preferably at least about 1000 ppm to preferably at most about 2000 ppm, more preferably at most about 1500 ppm. The tin catalyst may be any suitable tin catalyst such as those known in the art. Exemplary tin catalysts include tin (II) octanoate, tin (II) 2-ethylheptanoate, dibutyl tin (IV) dilaurate, and other tin catalysts which are similarly functionalized. Preferably the tin catalyst is tin (II) octanoate, tin (II) 2-ethylheptanoate, dibutyl tin (IV) dilaurate or combination thereof.

Generally, when a titanium catalyst is employed, the amount of catalyst is at least about 100 ppm to at most about 2500 ppm by weight of titanium to the total reaction mixture. Preferably, the amount of titanium catalyst is at least about 250 ppm, more preferably at least about 500 ppm and most preferably at least about 1000 ppm to preferably at most about 2000 ppm, more preferably at most about 1500 ppm. The titanium catalyst may be any suitable such as those known in the art. Exemplary titanium catalysts include titanium tetraisopropoxide, titanium tetraisobutoxide, or any appropriately functionalized titanium (IV) alkoxide. Preferably the titanium catalyst is titanium tetraisopropoxide.

The ratio of VOB monomer to initiator reactive groups is typically at least a stoichiometric amount (i.e., if the initiator is 1 mole of glycerol, the amount of VOB monomer is at least 3 moles) to at most about 100. Preferably the ratio of VOB monomer to initiator reactive groups is at least 2, more preferably at least about 5, even more preferably at least about 7 and most preferably at least about 10, to preferably at most about 50, more preferably at most about 25, and most preferably at most about 20. It has been surprisingly found when using these higher ratios even when reacting with a VOB monomer having multiple hydroxy group monomers therein a VOB polyol may be formed that is non-gelled and even a liquid.

When employing the method of the present invention, it has been surprisingly discovered that a VOB polyol may be formed that has at least a portion of the polyol being comprised of a polyol molecule that has at least one initiator reactive group that is unreacted even while the VOB polyol as a whole has a VOB monomer to initiator reactive site ratio of at least 5. That is to say, the VOB polyol is comprised of

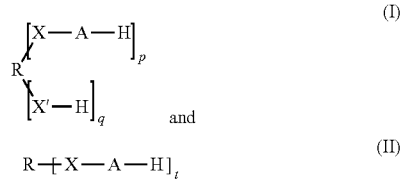

where
R is a residue of a polyol, polyamine or aminoalcohol initiator;
X and X' may be the same or different and is O, N or NH;
p is an integer from 1 to 5; q is an integer from 1 to 5 wherein p+q is from 3 to 8, t is an integer from 3 to 8 and A may be the same or different and is selected from the group consisting of A1, A2 and A3 where

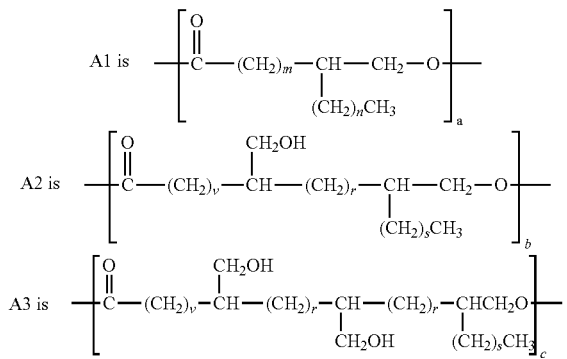

where m, n, v, r, s, a, b and c are integers and m is greater than 3, n greater than or equal to zero and m+n is from 11 to 19, v is greater than 3, r is greater than or equal to zero, s is greater than or equal to zero and v+r+s is from 10 to 18, a is from 0 to 35, b is from 0 to 35 and c is from 0 to 35, so long as that all a's, b's and c's in any molecule of the vegetable oil based polyol are not all zero and (a+b+c)/(p+q+t) is about 5 to about 100 in the vegetable oil based polyol. The (a+b+c)/p+q+t) ratio is indicative of the VOB monomer to initiator reactive group ratio.

In a preferred embodiment, the VOB polyol has at least a portion of the polyol being comprised of A3 constituent. This particular embodiment is preferred, because, it allows the polyol to realize a sufficient hydroxyl functionality while achieving a sufficient molecular weight for use to make, for example, flexible polyurethane foams using the VOB polyol as the sole polyol reacted with an isocyanate to form the polyurethane foam. Preferably, the amount of the A3 constituent in the VOB polyol is at least about 0.01 weight percent of the total VOB polyol, more preferably the amount is at least about 0.02 weight percent, most preferably at least about 0.05 weight percent to preferably at most about 25 weight percent, more preferably at most about 20 weight percent and most preferably at most about 10 weight percent of the VOB polyol.

When the VOB polyol contains A3, (a+b+c)/(p+q+t) is greater than 0 to about 100. Preferably, (a+b+c)/(p+q+t) is at least about 0.25, more preferably at least about 0.5, most preferably at least about 1, to preferably at most about 50, more preferably at most about 25 and most preferably at most about 20.

In one embodiment, when the VOB polyol includes A3, the total weight of A1+A2+A3 may include an amount of A1 of greater than about 10, preferably greater than about 25, to less than about 95 percent, an amount of A2 of greater than about 1 to less than about 65 percent, and an amount of A3 of greater than about 0.1 to less than about 10 percent by weight, based on the total weight A1+A2+A3. Furthermore, the ratio of the A2 to A3 may be greater than 5/1.

In another preferred embodiment when employing an initiator having, for example, a secondary hydroxyl or amine, the VOB polyol may have a portion of the VOB polyol that has a structure

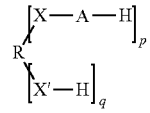

where at least one X'—H group is a primary hydroxyl or primary amine and at least one X-A-H is located at a position corresponding to a secondary hydroxyl or secondary amine of the initiator. Preferably, the VOB polyol is at least partially comprised of the above structure where all of the X'—H groups are a primary hydroxyl or primary amine and all of the X-A-H groups are located at a position corresponding to a secondary hydroxyl or secondary amine of the initiator.

The VOB polyol may be used to make polyurethanes by reacting it with a polyisocyanate such as those known in the art using known methods to make such polyurethanes. Preferably the polyurethane is a flexible foam. More preferably the polyurethane is a flexible foam that has been formed by reacting the VOB polyol with a polyisocyanate in the absence of any other polyol. That is to say the VOB polyol is the sole polyol that is used to make the flexible foam.

Generally the VOB polyol may have a weight average molecular weight of about 350 to about 10,000. Preferably the weight average molecular weight is at least about 500, more preferably at least about 1000 and most preferably at least about 1200 to preferably at most about 10,000, more preferably at most about 6000 and most preferably at most about 3000. It is preferred that the VOB polyol is a liquid and surprisingly the method employed is capable of making high molecular weight polyols without gellation.

VOB polyols of the invention may be used with any of the additives commonly known in the art for the production of polyurethane polymers. Any of a range of additives such as blowing agents, catalysts, surfactants, cell openers, colorants, fillers, load bearing enhancement additives such as copolymer polyols, water, internal mold releases, antistatic agents, antimicrobial agents, and other additives known to those skilled in the art are useful within the scope of the invention.

While the full range of surfactants which are typically used in the formation of polyurethane foams are useful, certain surfactants are preferred for foams which have high percentages of vegetable based polyols as the polyol component of the foam formulation. In particular, in the formation of flexible slabstock foam, high efficiency alkoxylsilane surfactants such as those commonly used in specialty grades of flexible foam such as low-resiliency or "visco-elastic" foam are unexpectedly found to greatly enhance the properties of flexible slabstock foams made when 100 percent of the polyol side of the foam is made from VOB polyol. Surfactants which are preferred are those such as L626 available from Crompton Corporation or other polyol pendant chains grafted with a silicone moiety. Property enhancements are observed in properties such as foam cell size, cell structure, foam feel or "hand," which is defined as the aesthetic feel or tactile quality of the foam, that indicates its fineness, texture, and durability, and foam porosity. The preferred surfactants result in slabstock foam products from 100 percent VOB polyol which have such properties comparable to slabstock foams prepared from 100 percent conventional commercial-grade EO/PO polyols.

It also has been found that the VOB polyols of this invention may form polyurethane foams made with a wide range of water concentrations. Generally, the water concentrations may range from about 1 part per hundred parts to about 10 parts per hundred parts of polyol by weight. Preferably, the water concentration is at least about 2, more preferably 3 and most preferably at least about 4 to preferably at most about 9, more preferably at most 8 and most preferably at most about 6 parts per hundred parts of polyol by weight.

EXAMPLES

Examples 1-27

Methods for Producing Polyols from Vegetable Oil Based Fatty Acid Methyl Esters Hydroxymethylated fatty acid methyl esters of soybean oil and 9,(10)-hydroxymethyl stearate (from methyl oleate) are produced according to the procedure described in concurrently filed application titled "ALDEHYDE AND ALCOHOL COMPOSITIONS DERIVED FROM SEED OILS," having inventors Donald Morrison, et al., described previously.

Glycerol was obtained from the Sigma-Aldrich Chemical Company (CAS# [56-81-5]) and distilled under vacuum at 20 mm/183° C. Distilled glycerol was then stored under nitrogen until used.

CEI-625 is a glycerol initiated EO polyol with a number average molecular weight of 625. It is produced at The Dow Chemical Company.

Trimethylolpropane [77-99-6] is obtained from the Sigma-Aldrich Chemical Co.

1,6-hexanediol [629-11-8] is obtained from the Sigma-Aldrich Chemical Co.

CEI-1200 is a glycerol initiated EO polyol with a number average molecular weight of 1200. It is produced at The Dow Chemical Company.

PE-270 is a pentaerythritol based polyol which has been ethoxylated with ethylene oxide to a number average molecular weight of 270. PE-270 is available from Aldrich Chemical Company of Milwaukee, Wis.

Tetrol 600 is pentaerythritol which has been ethoxylated to a number average molecular weight of 600. It was prepared at The Dow Chemical Co.

Tetrol 800 is pentaerythritol which has been ethoxylated to a number average molecular weight of 800. It is available from Sigma Aldrich Chemical Company of Milwaukee, Wis., and is sold as pentaerythritol ethoxylate [30599-15-6].

Sucrose [57-50-1] is obtained from the Imperial Sugar Co.

D-Sorbitol [50-70-4] is obtained from the Sigma Aldrich Chemical Co.

Pentaerythritol [115-77-5] is obtained from the Sigma Aldrich Chemical Co.

N-methylpyrrolidinone (NMP) [872-50-4] is obtained from the Sigma Aldrich Chemical Co.

Diethylene Glycol [111-46-6] is obtained from the Sigma Aldrich Chemical Co.

Voranol 370 is a mixture of sucrose and glycerol propoxylated to a NW of ~800. It has an average functionality of 6.85, and is obtained from The Dow Chemical Co.

Potassium Carbonate [584-08-7] is obtained from the Sigma Aldrich Chemical Co.

Ethylene Diamine [107-15-3] is obtained from the Sigma Aldrich Chemical Co.

Vanox 945 is an antioxidant package available from RT Vanderbilt Co. Inc. It is a mixture of 60-70 percent benzeneamine, —N-phenyl-, reaction product with 2,4,4-trimethylpentene and 2-methylpropene [184378-08-3], 20-25 percent tetrakis(methylene(3,5-di-t-butyl-4-hydroxyhydrocinnamate))methane [6683-19-8], 9 percent petroleum process oil, <3.0 percent DMS extractable material [64742-52-5], <1 percent diphenylamine [122-39-4], 1 percent phenothiazine [92-84-2].

Irganox 5057 is benzeneamine, —N-phenyl-, reaction product with 2,4,4-trimethylpentene [68411-46-1] available from Ciba Co.

Tin (II) Octanoate [301-10-0] is available from City Chemical Co.

Ti (IV) isopropoxide [546-68-9] is obtained from the Sigma Aldrich Chemical Co.

Stannous Octanoate [301-10-0] is available from City Chemical Co.

Calcium acetate [62-54-4] is obtained from Sigma Aldrich Chemical Co.

Tin (II) ethyl hexanoate [301-10-0] is obtained from Sigma Aldrich Chemical Co.

Dibutyltin dilaurate [77-58-7] is available from Sigma Aldrich Chemical Company of Milwaukee, Wis.

Lipase catalyst is derived from *candida antarctica* and is supported on acrylate beads. This polymer-supported lipase catalyst is available from Sigma Aldrich Chemical Company of Milwaukee, Wis.

Hydroxyl equivalent weight analysis is performed by the Olin Titration method.

Percent acidity is measured by the ASTM test method designation D 4662-93.

Molecular weight values (Mn, Mw, Mz, Mp, PD) are measured by gel permeation chromatography using Polymer Labs PL Gel columns and polyethylene oxide or polystyrene standards.

Examples 1-17

A General Polymerization Procedure for Seed Oil Polyols Produced from Fatty Acid Methyl Esters Hydroxymethylated fatty acid methyl ester monomer was transferred into a three-necked reaction flask between 500 ml and 5000 ml in capacity, the choice of which is commonly known to those skilled in the art and is dependent on the amount of starting materials used. The reactor was equipped with a mechanical stirrer, packed condenser, nitrogen purge, heating mantle with thermowatch and a thermometer. A vacuum line equipped with a dry ice trap and vacuum regulator was attached. Initiator and monomer were added and the contents of the reactor stirred and degassed while heating to 50 degrees under 20 torr vacuum. Once the temperature was stable, catalyst was added and the temperature was increased to the final specified reaction temperature. The initial setting for the vacuum was started at 100 torr and the pressure was decreased slowly to 5-20 torr. Heating was continued at the specified reaction temperature until methanol-loss was no longer visible, usually at least about 1 hour, and no more than 28 hours. Heating was continued and a slow flow of nitrogen was added through the nitrogen purge while still maintaining a pressure of 5 to 20 torr. Polymerization was allowed to continue for at least 1 hour and no more than 28 hours. In some specified cases an antioxidant such as Vanox 945 or Irganox 5057 was added just before the fluid polymer is transferred to a glass jar under nitrogen.

The following tables describe the recipes used to produce polyols of the invention. The following examples of the invention are meant to illustrate but not limit the scope of the invention. In all tables, the term "M/I ratio" is meant to indicate the molar ratio of hydroxymethylated fatty acid methyl ester monomer to the initiator. The catalysts are identified according to the following designations: Sn(II) is stannous octanoate; Sn(IV) is dibutyl tin dilaurate; Ti(IV) is titanium tetraisopropoxide; Ca is calcium acetate.

Examples 1-10

Polyols Produced from 9(10)-Hydroxymethyl Stearate

Polyols were produced from 9, (10)-hydroxymethyl stearate using the specified initiator and catalyst using the above procedure and as detailed in the below Table I.

Examples 11-18

Polyols Produced from Hydroxymethylated Fatty Acid Methyl Esters of Vegetable Oils The vegetable oil based polyols were produced using the above general procedure from the hydroxymethylated fatty acid methyl esters of soybean oil and these polyols are shown in the below Table II.

TABLE I

Examples 1–10 Polyol Properties and Run Conditions:

| Example # | Initiator (moles) | Initiator Name | M/I mole ratio | Catalyst (PPM) | Temp (deg C.) | Run Time (hr) | Viscosity (cP at 25 C.) | Acidity (meq/g) | Hydroxyl percent | HEW | Mp | Mn | Mw | Mz | PD |
|---|---|---|---|---|---|---|---|---|---|---|---|---|---|---|---|
| 1 | 0.483 | Glycerol | 8.38 | Sn(II) 996 | 205 | 27 | 260 | 0.0145 | 4.209 | 404 | 430 | 786 | 1210 | 1841 | 1.53 |
| 2 | 0.2463 | Trimethylol propane | 1.5 | Sn(II) 97 | 210 | 14 | — | — | 1.49 | 1140 | 7863 | 4125 | 10,222 | 19,111 | 2.48 |
| 3 | 0.0337 | 1,4-Hexanediol | 9.04 | Sn(II) 2400 | 210 | 14 | — | — | 1.62 | 1047 | 8617 | 5088 | 13,217 | 25293 | 2.60 |
| 4 | 0.757 | CEI-1200 | 4.68 | Sn(II) 1000 | 205 | 4 | 3410 | 0.0112 | 2.088 | 814 | 4200 | 2937 | 4427 | 6192 | 1.51 |
| 5 | 0.422 | CEI-625 | 6.99 | Sn(II) 1227 | 195 | 12 | 6100 | 0.0064 | 2.3674 | 718 | 5281 | 2847 | 4823 | 7035 | 1.69 |
| 6 | 0.6223 | CEI-625 | 6.51 | Sn(II) 1012 | 205 | 24 | 2920 | 0.00168 | 1.999 | 850 | 5440 | 3118 | 5295 | 7473 | 1.6982 |
| 7 | 0.6243 | CEI-625 | 6.48 | Ti(IV) 1018 | 205 | 3 | 4540 | 0.0030 | 2.123 | 801 | 4451 | 2893 | 4524 | 6340 | 1.56 |
| 8 | 0.6234 | CEI-625 | 6.54 | Sn(IV) 995 | 205 | 1 | 2420 | 0.0023 | 1.837 | 925 | 3803 | 2629 | 3591 | 4573 | 1.37 |
| 9 | 0.4049 | CEI-625 | 10.0 | Ca 2494 | 205 | 27 | 3170 | 0.00392 | 1.746 | 974 | 5073 | 2967 | 5248 | 7552 | 1.77 |
| 10 | 0.060 | Tetrol 800 | 5.09 | Ti(IV) 1000 | 205 | 14 | 2790 | — | 2.56 | 663 | 5678 | 3073 | 6189 | 11,675 | 2.01 |

TABLE II

Example 11–18 Properties and Reaction Conditions:

| Example # | Initiator (moles) | Initiator Name | M/I mole ratio | Catalyst (PPM) | Temp (deg C.) | Run Time (hr) | Viscosity (cP at 25 C.) | Acidity (meq/g) | Hydroxyl percent | HEW | Mp | Mn | Mw | Mz | PD |
|---|---|---|---|---|---|---|---|---|---|---|---|---|---|---|---|
| 11 | 0.395 | CEI-625 | 7.96 | Sn(II) 1188 | 195 | 12 | 5140 | 0.0030 | 2.02 | 841 | 4472 | 2959 | 5018 | 6770 | 1.70 |
| 12 | 0.523 | CEI-625 | 5.98 | Sn(II) 1365 | 195 | 12 | 4100 | 0.00248 | 2.254 | 754 | 4009 | 2615 | 4342 | 6413 | 1.66 |
| 13 | 0.512 | CEI-625 | 5.95 | Sn(II) 891 | 195 | 6 | 2730 | 0.00064 | 1.881 | 904 | 3118 | 2347 | 3612 | 5185 | 1.54 |
| 14 | 0.404 | Tetrol 600 | 9.98 | Sn(II) 995 | 205 | 3 | 2680 | 0.0086 | 1.512 | 1124 | 4643 | 2877 | 4595 | 6410 | 1.60 |
| 15 | 1.445 | CEI-625 | 6.03 | Sn(II) 701 | 195 | 10 | 3450 | 0.00143 | 2.2524 | 755 | 3977 | 2858 | 4304 | 6065 | 1.51 |
| 16 | 0.637 | CEI-625 | 5.99 | Sn(II) 827 | 195 | 12 | 3720 | 0.0059 | 2.233 | 761 | 4000 | 2687 | 4270 | 6152 | 1.59 |
| 17 | 2.09 | PE-270 | 1.0 | Sn(II) 1097 | 195 | 9 | 4100 | 0.0037 | 11.67 | 145 | 1082 | 1053 | 1450 | 2014 | 1.38 |
| 18 | 1.25 | CEI-625 | 1.55 | Sn(II) 1034 | 195 | 10 | 1160 | 0.00401 | 5.22 | 325 | 1299 | 1491 | 2047 | 2861 | 1.37 |

Examples 19-22

Large Scale Preparation of Vegetable Oil Based Polyols Using CEI-625 Initiator and Stannous Octanoate Catalyst Hydroxymethylated methyl esters of soybean oil and CEI-625 were combined in a reactor with stirring, and the oxygen was purged from the reactor by pulling a vacuum on the reactor and refilling the reactor with nitrogen. Catalyst (stannous octanoate) was added to the reactor and agitation was continued. A slow nitrogen sparge was fed to the reactor and the mixture was heated to 205° C. while maintaining a vacuum of 80 torr. The heating was continued for a minimum of 4 hours under a constant vacuum with a slow nitrogen sweep. The mixture was cooled to 62° C. and the antioxidant Irganox 5057 (121 grams) was added with continuing agitation.

In the following examples, FAME indicates the source of the fatty acid methyl ester used for the polymerization, with HMS indicating hydroxymethyl stearate and Soy indicating hydroxymethylated soybean oil. The catalyst Sn(II) is stannous octanoate. The properties and reaction conditions of the polyols of Examples 19-22 are shown in Table III.

reaction flask between 1000 ml and 5000 ml in capacity, the choice of which is commonly known to those skilled in the art and is dependent on the amount of starting materials used. The reactor was equipped with a mechanical stirrer, packed condenser, nitrogen purge, heating mantle with thermowatch and a thermometer. A vacuum line equipped with a dry ice trap and vacuum regulator was attached.

The reactants (monomer and initiator) were weighed into the flask and heated to 50° C. under 20 torr vacuum. Following this degassing step, the catalyst (0.5 g) was added. The reactor was maintained at 50° C. at 20 torr vacuum for 6 hours. Then the reactor was heated to 60° C. under 20 torr vacuum and held there for 12 more hours. The reactor was cooled to 50° C. and the product filtered through a funnel with a plug of glass wool. The product solidified on standing at room temperature and this polyol's properties and reaction conditions are shown in Table IV.

TABLE III

Properties and Reaction Conditions of Examples 19–22

| Example # | FAME Kg | Initiator CEI-625 Kg | M/I mole ratio | Catalyst PPM | Temp (deg C.) | Run Time (hr) | Viscosity (cP at 25 C.) | Acidity (meq/g) | Hydroxyl percent | HEW | Mp | Mn | Mw | Mz | PD |
|---|---|---|---|---|---|---|---|---|---|---|---|---|---|---|---|
| 19 | HMS 38.83 | 11.39 | 10:1 | Sn(II) 1002 | 225 | 4.5 | 2800 | 0.00354 | 2.06 | 825 | 5136 | 3121 | 5136 | 7179 | 1.6456 |
| 20 | HMS 70.31 | 20.59 | 10:1 | Sn(II) 1000 | 205 | 4 | 3010 | 0.000713 | 2.0421 | 832 | 4970 | 3015 | 5039 | 7072 | 1.6713 |
| 21 | Soy 26.15 | 11.8 | 6:1 | Sn(II) 1005 | 195/20 | 12 | 3940 | 0.002 | 2.256 | 772.30 | 4040 | 2669 | 4367 | 6403 | 1.64 |
| 22 | Soy 26.15 | 11.8 | 6:1 | Sn(II) 1000 | 195/20 | 12 | 3570 | 0.00489 | 2.363 | 779.56 | 3925 | 2578 | 4293 | 6409 | 1.67 |

Examples 23-24

Lipase-catalyzed, Saccharide-initiated Polyols

Hydroxymethylated fatty acid methyl ester monomer prepared from soybean oil was transferred into a three-necked

TABLE IV

Properties and Reaction Conditions of Examples 23 and 24.

| Example # | Initiator (moles) | Initiator Name | M/I Mole ratio | Lipase Catalyst (g) | Temp (deg C.) | Run Time (hr) | Viscosity (cP at 25 C.) | Acidity (meq/g) | Hydroxyl percent | HEW | Mp | Mn | Mw | Mz | PD |
|---|---|---|---|---|---|---|---|---|---|---|---|---|---|---|---|
| 23 | 0.0786/ 0.0672 | Glycerol/ Sucrose | 1.49 | 0.50 | 50 | 42 | 5300 | 0.0356 | 8.110 | 209.6 | 836 | 1126 | 1454 | 2542 | 1.29 |
| 24 | 0.0798 | Glycerol | 8.34 | 0.50 | 50 | 42 | 592 | 0.00643 | 3.563 | 477.1 | 800 | 1207 | 1504 | 1954 | 1.25 |

Examples 25-26

Saccharide-initiated Seed Oil Polyols Produced with NMP Cosolvent

Hydroxymethylated fatty acid methyl ester monomer derived from soybean oil was transferred into a three-necked reaction flask between 1000 ml and 5000 ml in capacity. The reactor was equipped with a mechanical stirrer, packed condenser, nitrogen purge, heating mantle with thermowatch and a thermometer. A vacuum line equipped with a dry ice trap and vacuum regulator was attached. The reactants (monomer and initiator) were weighed into the flask and heated to 195° C. under 20 torr vacuum. The system was maintained at this temperature for 3 hours during which time water was removed from the system. The system was heated to 195° C. under 20 torr vacuum for 5 hours to remove the remainder of the water.

The system was opened and 0.71 gram of catalyst was added. The reactor was heated to 195° C. under 20 torr vacuum and held there for 6 hours. The reactor was cooled to 170° C. and 522 grams of NMP and another 0.71 gram catalyst charge was added. The temperature was maintained for 2 hours. Then 40 g of potassium carbonate was added and the vacuum was maintained at 100 torr. The temperature was maintained for 3 hours. The reactor contained a clear dark amber very viscous liquid. The NMP was removed. After no more NMP could be removed the reactor was shutdown and left at 80° C. to avoid solid formation. The reactor was heated to 180° C. and slowly dumped through a funnel containing a plug of glass wool to remove any solid carbonate. A heat lamp was necessary to keep the liquid flowing. In these Examples, the catalysts Sn(II) was stannous octanoate. The properties and run conditions for Examples 25 and 26 are shown in Table V.

Hydroxymethylated fatty acid methyl ester monomer was transferred into a three-necked reaction flask between 1000 ml and 5000 ml in capacity, the choice of which is commonly known to those skilled in the art and is dependent on the amount of starting materials used. The reactor was equipped with a mechanical stirrer, packed condenser, nitrogen purge, heating mantle with thermowatch and a thermometer. A vacuum line equipped with a dry ice trap and vacuum regulator was attached.

The reactants (monomer and initiator) were weighed into the flask and heated to 90° C. under 100 torr vacuum. After 30 minutes, the vacuum was broken and $K_2CO_3$ was added. The reactor was heated to 120° C. under 100 torr vacuum, and after 1 hour the stannous octanoate was added. The pressure was decreased to 50 torr and the system became visibly viscous and slightly yellow after 6 hours. The reactor was heated to 60° C. and the product was transferred to a storage container.

TABLE V

Properties and Run Conditions of Examples 25 and 26.

| Example # | Initiator (moles) | Initiator Name | M/I Mole ratio | Catalyst (PPM) Sn(II) | Temp (deg C.) | Run Time (hr) | Viscosity (cP at 25 C.) | Acidity (meq/g) | Hydroxyl percent | HEW | Mp | Mn | Mw | Mz | PD |
|---|---|---|---|---|---|---|---|---|---|---|---|---|---|---|---|
| 25 | 0.98 | Sorbitol | 3.0 | 1204 | 195 | 8 | >196000 | 0.01007 | 7.064 | 240 | 5856 | 2750 | 4885 | 7433 | 1.78 |
| 26 | 1.90 | Pentaerythritol | 2.0 | 942 | 205 | 10 | >196000 | 0.00335 | 6.223 | 273 | 1213 | 2904 | 4542 | 6670 | 1.56 |

Examples 27-28

Seed Oil Polyols Produced with $Sn(II)/K_2CO_3$ Cocatalysts

In the following examples the catalysts are identified according to the following designations: Sn(II) is stannous octanoate, and $K_2CO_3$ is potassium carbonate.

TABLE VI

Properties and Conditions of Examples 27 and 28.

| Example # | Initiator (moles) | Initiator Name | M/I Mole ratio | K2CO3/ Sn(II) Catalyst (PPM) | Temp (deg C.) | Run Time (hr) | Viscosity (cP at 25 C.) | Acidity (meq/g) | Hydroxyl percent | HEW | Mp | Mn | Mw | Mz | PD |
|---|---|---|---|---|---|---|---|---|---|---|---|---|---|---|---|
| 27 | 1.14 | Voranol 370 | 0.90 | 4699/509 | 90–110 | 6 | 2680 | 0.00081 | 9.338 | 182 | 831 | 795 | 826 | 858 | 1.04 |
| 28 | 1.02 | Diethylene Glycol | 2.93 | 7040/598 | 120 | 6 | 3230 | — | 4.075 | 417 | 3573 | 2823 | 4064 | 5657 | 1.44 |

Example 29

Seed Oil Polyol Produced from Amine-Containing Initiator

The hydroxymethylated fatty acid methyl ester mixture derived from soybean oil (soy monomer) (100 g) was transferred into a 250-ml three-neck flask equipped with a magnetic stirrer, condenser/nitrogen purge with moisture trap, a heating mantle with thermowatch and a thermometer. Ethylenediamine (9.12 g) was added and heated to 140° C. under $N_2$. Once the temperature was stable, Tin (II) 2-ethylhexanoate catalyst (0.1133 g) was added and the mixture was stirred overnight. The nitrogen line was then replaced with a vacuum line. Vacuum was gradually drawn down to 50 torr. The reaction was monitored periodically to insure the vacuum was stable. The polymerization was continued overnight. The vacuum was removed and the polyol was cooled and collected. The polyol at 25° C. was a solid and the Mp, Mn, Mw, Mz and PD of the polyol was 955, 1034, 1316, 1598 and 1.27.

Example #30

Seed Oil Polyol Produced with a Different Order of Addition of the Monomer and Initiator The VOB monomer (the hydroxymethylated fatty acid methyl ester mixture derived from soybean oil) only was weighed (8.5 moles) into the flask and the reactor was heated under 20 torr vacuum to 50° C. Following the degassing the vacuum was broken and 1.58 g of catalyst (tin II Octonoate) was added and the system heated to 195° C. at 20 torr. The reaction was closely monitored to make sure that the homopolymerization was not allowed to go so far as to gel. After 4 hours, the solution was noticeably viscous even at 195° C., the reactor was shutdown, sampled, and left under nitrogen overnight. CEI-625 initiator was weighed (1.38 moles) into the flask and the reactor heated to 195° C. under 20 torr vacuum. The solution was noticeably turbid even after heating. After about 2 hours at 195° C., the system had cleared and the solution was much less viscous. After about 8 hours the reactor was cooled to 100° C. and 9.1 grams of Irganox 1076 and 5.1 grams of Vanox 945 were added and the polyol was collected into a glass storage container. The properties of this polyol appear in Table VII.

TABLE VII

Properties of Example 30

| Example # | Viscosity (cP at 25 C.) | Acidity (meq/g) | Hydroxyl percent | HEW | Mp | Mn | Mw | Mz | PD |
|---|---|---|---|---|---|---|---|---|---|
| 30 | 3440 | 0.00323 | 2.573 | 660 | 4725 | 3163 | 4560 | 6184 | 1.44 |

Examples 31-67

Methods for Production of Polyurethanes from Seed Oil Polyols

All foam samples are prepared in a consistent manner according to the following general procedure.

Chemical components which are used for the preparation of flexible and rigid polyurethane foams include but are not limited to:

Diethanolamine (DEOA) is a molded foam crosslinker which is available from The Dow Chemical Co.

Dabco 33LV is a 33 percent crystalline diethylenetriamine in 67 percent dipropylene glycol. It is a molded foam catalyst which is available from Air Products and Chemicals, Inc.

Dabco DC 5164 is a molded foam silicone surfactant which is available from Air Products and Chemicals, Inc.

Tegostab-b8708 a molded foam silicone surfactant which is available from Degussa Goldschmidt Chemicals Corp.

Niax A-400 is a molded foam amine catalyst consisting of 40 percent tertiary amine/carboxylic salt (trade secret), 40 percent water, 20 percent bis(2-dimethylaminoethy)ether, and 4 percent hydroxyl compound (trade secret). Available from Crompton OSi Specialties Co.

Niax A-300 is a molded foam amine catalyst consisting of 40 percent tertiary amine/carboxylic salt (tradesecret), 20 percent triethylenediamine, and 40 percent water, available from Crompton OSi Specialties Co.

Polycat 58 is a proprietary composition amine catalyst used in molded foams, available from Air Products and Chemicals.

Polycat 5 is pentamethyl diethylene triamine. A rigid foam catalyst which is available from Air Products and Chemicals, Inc.

Polycat 8 is N,N-dimethyl cyclohexylamine. A rigid foam catalyst which is available from Air Products and Chemicals, Inc.

DC-5160, a flexible slabstock foam silicone surfactant is available from Air Products & Chemicals, Inc.

L-626 is a low-resiliency viscoelastic flexible slabstock foam surfactant available from Crompton Corp.

D-8264, is an optimized amine catalyst blend for slabstock foam available from Air Products & Chemicals, Inc.

Water used for these formulations is distilled, deionized water.

T-95, which is stannous octanoate catalyst, 33 percent by weight in dioctylphthalate is available from Air Products and Chemicals, Inc.

Voranol 3137A, which is a 2.7 average functional, 13 wt. percent ethylene oxide, heterofed 3100 MW polyol which is available from The Dow Chemical Company.

Voranol 3943A, which is an 1807 equivalent weight copolymer polyol based on Voranol 3136 (A 3100 MW 13 percent EO hetero clear polyol) and 43 wt. percent styrene/acrylonitrile solids, is available from The Dow Chemical Company.

Voranol 3512: A 2.7 functional, 3500 MW 13 percent wt. percent ethylene oxide, heterofed polyol, is available from The Dow Chemical Company.

Voranol 3010, which is a 2.8 functional, 3000 MW 8 percent ethylene oxide heterofed polyol, is available from The Dow Chemical Company.

Voranol 3022J, which is a 2.6 functional, 3000 MW all propylene oxide polyol, is available from The Dow Chemical Company.

Specflex NC-632 is a 4.7 functional, propylene oxide block plus 15 percent ethylene oxide capped 1750 EW polyol used in flexible molded foam. Available from The Dow Chemical Co.

Specflex NC-700 is a 40 percent solids (styrene-acrylonitrile) copolymer polyol based on Voranol 4735 (a 3.0 functional, propylene block plus 17 percent ethylene oxide capped polyol with a 1580 equivalent weight) used in flexible molded foams. Nominal equivalent weight is 2600. Available from The Dow Chemical Co.

Voranol 3136: A 2.7 average functionality, 13 wt. percent ethylene oxide heterofed 3100 MW polyol used to make slabstock foam. Available from The Dow Chemical Co.

Voranol CP 1421: A 2.94 average functionality, 80 percent ethylene oxide heterofed 5000 MW polyol used in flexible slab and molded foams which is available from The Dow Chemical Co.

DABCO T-9 is stabilized stannous octanoate, a catalyst used in flexible slabstock foams, available from Air Products and Chemicals, Inc.

VORANATE T-80 is type I TDI (toluene diisocyanate) with an equivalent weight of 87. Used in making flexible foams, it is available from The Dow Chemical Co.

PAPI 27 is a 2.7 functional polymeric MDI (methylenediisocyanate) with an equivalent weight of 134. Used in making rigid foams and available from The Dow Chemical Co.

Firemaster-550 is a mixture of halogenated aryl esters and aromatic phoshates. Used as a flame retardant in flexible foams. Available from Great Lakes Chemical Co.

L6900 is a silicone surfactant used in rigid foams. Available from Crompton Osi Specialties Co.

HCFC Forane 141b is a hydrochloroflourocarbon blowing agent used in rigid foams. Available from Atonfina Chemicals, Inc.

Dypol 6862 is a solvent free pale yellow branched poly alcohol with ester and ether groups, available from Dyflex.

Baylith L is a 50 percent mixture of 3 angstrom molecular sieves in Castor oil, available from Bayer.

VORANATE M 220 is a polymeric MDI functionality 2.7 available from The Dow Chemical Company.

ISONATE M 143 is a carbodiimide modified pure MDI available from The Dow Chemical Company.

General Procedure for the Production of Polyurethanes from Vegetable Oil-Based (VOB) Polyols All of the polyol components of a given formulation except the tin catalyst (stannous octanoate in dioctylphthalate, T-95), were individually metered and weighed into a one quart capacity metal cup. The contents were premixed for 15 seconds at 1800 rpm using a pin type mixer. The tin catalyst, dispensed by volume, was then added to the stirred components and mixed for an additional 15 seconds at 1800 rpm. A stoichiometric amount of Toluene Diisocyanate (Voranate T-80), was then added to the cup and vigorously mixed for 3 seconds at 2400 rpm. The cup contents were then poured into a 15"×15"×10" wooden box lined with a polyethylene bag. The blowoff time and any other distinct reaction characteristics were recorded. The foam buns were allowed to cure overnight under a ventilated fume hood. They were then placed in ambient storage and submitted for physical property assessment using ASTM test method designation D 3574-95.

Where indicated, other slabstock foam data were generated on conventional continuous machines (Polymech or UBT) featuring a reciprocating mixing head and high pressure injection of all streams except the polyol. The polyol and isocyanate temperatures were maintained at around 23° C. The polyol output was 20 kg/min. (The polyols used in Examples 34-36 and Examples 49-51 were blended with Voranol 3137A either in the polyol tank or in the mixing head.).

According to the general procedure, the foams were prepared according to the following formulations, with the results of mechanical testing included in the tables:

TABLE VIII

Examples 31–33. Box foams prepared from hydroxymethyl stearate polyols

| | Example # | | |
|---|---|---|---|
| | 31 | 32 | 33 |
| Components | | | |
| V-3137A | 80 | 65 | 50 |
| Polyol of Example # 6 | 20 | 35 | 50 |
| Water | 4.5 | 4.5 | 4.5 |
| D-8264 | 0.12 | 0.12 | 0.12 |
| DC5160 | 1 | 1 | 1 |
| T-95, mils | 0.4 | 0.4 | 0.4 |
| Index | 110 | 110 | 110 |
| TDI | 57.8 | 58.2 | 58.5 |
| Properties | | | |
| Blow-Off | 96 | 95 | 94 |
| Air Flow | 4.2 | 4.3 | 3.3 |
| Com. Set. | 3.7 | 4.3 | 4.4 |
| Density | 1.44 | 1.54 | 1.51 |
| 25 percent IFD | 39.8 | 41.3 | 43.2 |
| 65 percent IFD | 71.6 | 76.8 | 82.1 |
| Guide Factor | 27.6 | 26.8 | 28.6 |
| Resiliency | 38 | 37 | 36 |
| Tensile | 12.7 | 12.5 | 12.1 |
| Tear | 1.7 | 1.7 | 1.6 |
| Elongation | 104 | 90 | 74 |

TABLE IX

Examples 34–36. Flexible slabstock foam produced from hydroxymethyl stearate polyols on a continuous foam machine:

| | Example # | | |
|---|---|---|---|
| | 34 | 35 | 36 |
| Components | | | |
| Voranol* 3137A | 80 | 65 | 50 |
| Combined Polyols of Examples # 19 and #20 | 20 | 35 | 50 |

TABLE IX-continued

Examples 34–36. Flexible slabstock foam produced from hydroxymethyl stearate polyols on a continuous foam machine:

| | Example # | | |
|---|---|---|---|
| | 34 | 35 | 36 |
| Water | 4.5 | 4.5 | 4.5 |
| D-8264 | 0.12 | 0.12 | 0.12 |
| DC-5160 | 1.0 | 1.0 | 1.0 |
| DABCO T9 | 0.2 | 0.2 | 0.2 |
| Voranate T-80 | 57.8 | 58.1 | 58.4 |
| Foam Properties | | | |
| Density (kg/m3) | 21.1 | 21.2 | 21.4 |
| CFD 40 percent (kPa) | 3.9 | 4.3 | 4.5 |
| IFD 40 percent | 156.2 | 168.4 | 175.9 |
| SAG Factor | 2.7 | 2.8 | 2.9 |
| Hysterisis (percent) | 45 | 49 | 53 |
| Resilience (percent) | 40 | 36 | 36 |
| Guide Factor | 7.4 | 7.9 | 8.2 |
| Airflow (cfm) | 3.1 | 2.4 | 2.1 |
| Tensile (kPa) | 89 | 80 | 78 |
| Elongation (percent) | 142 | 128 | 102 |
| Tear (N/m) | 426 | 337 | 309 |

These Examples were produced on a continuous slabstock foam production machine at a TDI index of 110.

TABLE X

Examples 37–41. Flexible molded foam produced from hydroxymethyl stearate polyols

| | Example # | | | | |
|---|---|---|---|---|---|
| | 37 | 38 | 39 | 40 | 41 |
| Components | | | | | |
| Specflex NC-632 | 70.00 | 60.00 | 50.00 | 70.00 | 70.00 |
| Specflex NC-700 | 20.00 | 20.00 | 20.00 | 20.00 | 20.00 |
| Combined Polyols of Examples #19 and #20 | 10.00 | 20.00 | 30.00 | 10.00 | 10.00 |
| Voranol* CP 1421 | | | | 1.00 | |
| Polycat 58 | | | | | 0.30 |
| Niax A-300 | 0.25 | 0.25 | 0.25 | 0.25 | 0.25 |
| Niax A-400 | 0.10 | 0.10 | 0.10 | 0.10 | 0.10 |
| Tegostab-b8708 | 0.80 | 0.80 | 0.80 | 0.80 | 0.80 |
| Dabco 33LV | 0.30 | 0.30 | 0.30 | 0.30 | 0.30 |
| Dabco DC 5164 | 0.20 | 0.20 | 0.20 | 0.20 | 0.20 |
| DEOA PURE | 1.00 | 1.00 | 1.00 | 1.00 | 1.00 |
| WATER | 3.70 | 3.70 | 3.70 | 3.70 | 3.70 |
| TOTAL PARTS | 106.35 | 106.35 | 106.35 | 107.35 | 106.65 |
| WATER CONTENT OF THE BLEND | 3.65 | 3.65 | 3.65 | 3.61 | 3.64 |
| OH# OF THE POLYOL BLEND | 56.91 | 60.24 | 63.58 | 56.60 | 59.72 |
| INDEX | 100 | 100 | 100 | 100 | 100 |
| Foam Properties | | | | | |
| Density Core | 32.1 | 32.8 | 33.2 | 33.5 | 33.0 |
| CFD 50 percent | 4.9 | 5.5 | 5.6 | 5.0 | 4.7 |
| Tensile Strength | 106 | 114 | 125 | 109 | 102 |
| Elongation | 104 | 101 | 106 | 105 | 100 |
| Tear Strength | 281 | 271 | 284 | 255 | 266 |
| Resilience | 58 | 57 | 55 | 57 | 61 |
| Air Flow | 1.61 | 2.49 | 1.68 | 2.28 | 2.62 |
| Compression Set 50 percent | 6.5 | 6.4 | 8.1 | 6.0 | 6.2 |
| Compression Set 90 percent | 11.3 | 11.3 | 13.5 | 8.7 | 9.7 |
| Wet Compression set 70 percent | 21.3 | 20.7 | 24.3 | 17.0 | 22.1 |

TABLE XI

Examples 42–44. Flexible foam produced from seed oil polyol as a 35 percent and 50 percent (w/w) blend with conventional EO/PO polyol.

| | Example # | | |
|---|---|---|---|
| | 42 | 43 | 44 |
| Components | | | |
| V-3137a | 65 | 50 | 65 |
| Polyol of Example #12 | 35 | 50 | |
| Polyol of Example #13 | | | 35 |
| Water | 4.5 | 4.5 | 4.5 |
| DC-5160 | 1 | 1 | 1 |
| D-8264 | 0.12 | 0.12 | 0.12 |
| T-95 | 0.4 | 0.5 | 0.7 |
| Index | 110 | 110 | 110 |
| TDI | 58.4 | 58.9 | 57.7 |
| Blowoff | 126 | 105 | 95 |
| Airflow (cfm) | 4.3 | 2.5 | 2.6 |
| Density (pcf) | 1.48 | 1.41 | 1.4 |
| Tear (pli) | 1.4 | 1 | 1.3 |
| Mean(psi) | 12.2 | 13.3 | 12.8 |
| percent Elongation | 69.5 | 67.8 | 83.7 |
| CS_90orig | 4.2 | 4.9 | 4.3 |
| IFD_Slab: | | | |
| 25 percent lbs. | 39.2 | 47.2 | 44.9 |
| 65 percent lbs. | 76.3 | 92.2 | 84.3 |
| Resiliency | 30 | 33 | 33 |
| GuideFactor | 26.5 | 33.5 | 32.1 |

TABLE XII

Example 45: Flexible foam produced from seed oil polyol as a 65 percent (w/w) blend with conventional EO/PO polyol

| | Example # 45 |
|---|---|
| V-3136 | 35 |
| Polyol of Example #15 | 65 |
| Water | 4.5 |
| D-8264 | 0.12 |
| L-626 | 1 |
| DC5160 | 1 |
| T-95, mils | 0.32 |
| Index | 110 |
| TDI | 59.4 |
| Blow-Off (sec) | 88 |
| Air Flow | Not determined |
| Com. Set. | Not determined |
| Density | Not determined |
| 25 percent IFD | Not determined |
| 65 percent IFD | Not determined |
| Guide Factor | Not determined |
| Resiliency | Not determined |
| Tensile | Not determined |
| Tear | Not determined |

TABLE XIII

Examples 46–48: Flexible foams produced from seed oil polyol as 100 percent of the polyol component, and at different isocyanate indices

| | Example # | | |
|---|---|---|---|
| | 46 | 47 | 48 |
| V-3137A | | | |
| Polyol of Example #15 | 100 | 100 | 100 |
| Water | 4.5 | 4.5 | 4.5 |
| D-8264 | 0.12 | 0.12 | 0.12 |
| L-626 | 3 | 3 | 3 |
| DC5160 | | | |
| T-95, mils | 0.38 | 0.28 | 0.38 |
| Index | 100 | 110 | 120 |
| TD | 57.4 | 63.1 | 68.8 |
| Blow-Off | | 87 | 104 |
| Air Flow | 0.91 | 0.63 | 0.31 |
| Density | 1.56 | 1.52 | 1.48 |
| 25 percent IFD | 39.6 | 37.8 | 49.6 |
| 65 percent IFD | 87.9 | 93.6 | 95.5 |
| Guide Factor | 25.4 | 24.9 | 33.5 |
| Resiliency | 28 | 29 | 32 |

TABLE XIV

Examples 49–51: Continuous Production of flexible slabstock foam from vegetable oil based polyol at 20 percent, 35 percent and 50 percent

| | Example # | | |
|---|---|---|---|
| | 49 | 50 | 51 |
| Components | | | |
| V-3137 | 80 | 65 | 50 |
| Combined Polyol of Examples #21 and #22 | 20 | 35 | 50 |
| Water | 4.5 | 4.5 | 4.5 |
| D-8264 | 0.12 | 0.12 | 0.12 |
| DC5160 | 1 | 1 | 1 |
| DABCO T-9 | 0.16 | 0.14 | 0.12 |
| Index | 110 | 110 | 110 |
| Voranate T80 | 57.4 | 58.4 | 58.8 |
| Properties | | | |
| Air Flow | 4.5 | 4.1 | 4.1 |
| Compression Set 75 percent | 3.5 | 4.7 | 7.8 |
| Density (kg/m^3) | 22.8 | 23.4 | 22.5 |
| 40 percent IFD | 166.6 | 167.5 | 186.4 |
| Guide Factor | 7.3 | 7.2 | 8.3 |
| SAG | 2.7 | 2.7 | 2.9 |
| Resiliency (percent) | 42 | 39 | 39 |
| Tensile (kPa) | 60 | 61 | 75 |
| Tear (N/m) | 279 | 266 | 194 |
| Elongation | 88 | 93 | 71 |

TABLE XV

Example 52: Flexible foam produced from seed oil polyol with copolymer polyol

| | Example # 52 |
|---|---|
| Components | |
| Voranol-3136 | 15 |
| Voranol-3943A | 35 |
| Polyol of Example #15 | 50 |
| Water | |
| D-8264 | 0.12 |
| DC5160 | 1 |
| T-95, mils | 0.32 |
| Index | 110 |
| TDI | 57.5 |
| Blow-Off (sec) | 93 |
| Air Flow | 4 |
| Com. Set. | 1.9 |
| Density | 1.48 |
| 25 percent IFD | 37.61 |
| 65 percent IFD | 92.3 |
| Guide Factor | 25.4 |
| Resiliency | 31 |

TABLE XVI

Examples 53–56: Flexible molded foams produced from seed oil polyol with copolymer polyol:

| | Example # | | | |
|---|---|---|---|---|
| Components | 53 | 54 | 55 | 56 |
| Specflex NC-632 | 70.00 | 60.00 | 50.00 | 40.00 |
| Specflex NC-700 | 20.00 | 20.00 | 20.00 | 20.00 |
| Combined Polyols from Examples #21 and #22 | 10.00 | 20.00 | 30.00 | 40.00 |
| Voranol CP 1421 | | | | |
| Polycat 58 | | | | |
| Niax A-300 | 0.25 | 0.25 | 0.25 | 0.25 |
| Niax A-400 | 0.10 | 0.10 | 0.10 | 0.10 |
| Tegostab-b8708 | 0.80 | 0.80 | 0.80 | 0.80 |
| Dabco 33LV | 0.30 | 0.30 | 0.30 | 0.30 |
| Dabco DC 5164 | 0.20 | 0.20 | 0.20 | 0.20 |

TABLE XVI-continued

Examples 53–56: Flexible molded foams produced from seed oil polyol with copolymer polyol:

| | Example # | | | |
|---|---|---|---|---|
| Components | 53 | 54 | 55 | 56 |
| DEOA PURE | 1.00 | 1.00 | 1.00 | 1.00 |
| WATER | 3.70 | 3.70 | 3.70 | 3.70 |
| TOTAL PARTS | 106.35 | 106.35 | 106.35 | 106.35 |
| WATER CONTENT OF THE BLEND | 3.65 | 3.65 | 3.65 | 3.65 |
| OH# OF THE POLYOL BLEND | 57.71 | 61.84 | 65.98 | 70.12 |
| INDEX | 100 | 100 | 100 | 100 |
| Density Core | 35.4 | 36.8 | 35.5 | 33.8 |
| CFD 50 percent | 5.6 | 6.6 | 6.2 | 6.4 |
| Tensile Strength | 107 | 134 | 109 | 107 |
| Elongation | 103 | 107 | 93 | 84 |
| Tear Strength | 223 | 220 | 237 | 198 |
| Resilience | 53.5 | 52 | 48.5 | 43.5 |
| Air Flow | 1.0 | 1.7 | 1.5 | 1.3 |
| Hardness Loss after Fatigue | 32 | 34 | 37 | 40 |
| Compression Set 50 percent | 7 | 8 | 10 | 12 |
| Compression Set 90 percent | 9 | 10 | 14 | 17 |
| Wet Compression set 70 percent | 17 | 20 | 22 | 24 |

Example 57

Flexible Foam Produced from Seed Oil Polyol Using High Water Level in the Formulation

TABLE XVII

Example 57 Components and Characteristics.

| | Example # 57 |
|---|---|
| V-3137A | 50 |
| Polyol of Example #16 | 50 |
| Water | 6 |
| D-8264 | 0.1 |
| DC5160 | 1 |
| T-95, mils | 0.35 |
| Index | 110 |
| TDI | 75.1 |
| Blow-Off | 107 |
| Air Flow | 4.3 |
| Density | 1.15 |
| 25 percent IFD | 33.5 |
| 65 percent IFD | 78.8 |
| Guide Factor | 29.1 |
| Resiliency | 34 |

Examples 58-62

Rigid Foams Prepared from Seed Oil Polyols
General Procedure for the Production of Rigid Foams Foam components were measured to an appropriate total blended mass which was appropriate for the size of the container into which the foam will be formed, according to the ratios in the Table XVIII for Examples 58-62. The isocyanate component was weighed into a mixing cup separately. All components except for the isocyanate were combined in a mixing cup and stirred at 1000 rpm for 6 seconds. The isocyanate was then added to the blend of all other components in the polyol, and this new mixture was blended at 1000 rpm for 6 seconds. The foam mixture was then poured into the container in which the foam was to be formed. The following characteristics were measured: gel-time which is defined as when a tongue depressor inserted into the foam draws strings when removed (not surface stringing but stringing from foam Interior), and tack free-time which is defined as when the foam surface is no longer tacky, or does not adhere to touch. Results of these Examples are shown in Table XVIII

TABLE XVIII

Results of Examples 58–62

| | Example # | | | | |
|---|---|---|---|---|---|
| | 58 | 59 | 60 | 61 | 62 |
| Components | | | | | |
| Voranol 360 | 50 | 75 | 50 | 25 | 0 |
| Polyol of Example #25 | 50 | | | | |
| Polyol of Example #27 | | 25 | 50 | 75 | 100 |
| Polycat 5 | 1 | 1 | 1 | 1 | 1 |
| Polycat 8 | 2 | 2 | 2 | 2 | 2 |
| Polycat 46 | 1 | 1 | 1 | 1 | 1 |
| L-6900 | 2.15 | 2.15 | 2.15 | 2.15 | 2.15 |
| Water | 2.58 | 2.58 | 2.58 | 2.58 | 2.58 |
| HCFC-141b | 20 | 20 | 20 | 20 | 20 |
| PAPI 27 | 137 | 137 | 137 | 137 | 137 |
| Properties | | | | | |
| Gel Time (sec) | 29 | 35 | 41 | 40 | 30 |
| Tack Free (sec) | 40 | 63 | 66 | 65 | 45 |
| Crown Density (lbs/cft) | 1.59 | 1.41 | 1.38 | 1.499 | 1.446 |

Examples 63 and 64

Elastomers and Coatings Prepared from Vegetable Oil-based Polyol

Polyols of the examples were blended together by adding molecular sieves (Baylith L) and mixing by hand for 5 minutes. The blend is then degassed in a vacuum oven until no bubbles were retained.

Method for Production of an Elastomer Plate or a Coating

The polyol of the example and the isocyanate were mixed at room temperature for a minimum of 1 minute to achieve complete homogeneity. The resulting mixture was cast into a mold of 2 mm thickness for preparation of an elastomer, or cast onto a flat surface for the preparation of a coating. Curing of a thin layer (2 mm) at atmospheric condition gave a good elastomer without bubbles. Alternatively, the casting was cured in an oven for 1 hour at 75° C.

The resulting polyurethane sample was kept at room temperature for 7 days before testing, or alternatively was post cured at 75° C. 10 hours before testing.

TABLE XIX

Examples 62 and 63 Components and Results.

| | Example # | |
|---|---|---|
| | 62 | 63 |
| Components | | |
| Castor oil | | |

TABLE XIX-continued

Examples 62 and 63 Components and Results.

|  |  | Example # | |
| --- | --- | --- | --- |
|  |  | 62 | 63 |
| Dypol 6862 |  |  |  |
| Polyol of Example #18 |  | 100 | 100 |
| Baylith L |  | 5 | 5 |
| VORANATE M 220 |  | 42.5 |  |
| ISONATE M 143 |  |  | 45.5 |
| Properties |  |  |  |
| Tensile strength | MPa | 4.7 | 4.0 |
| Elongation | percent | 56 | 76 |
| Tear strength | N/cm | 56 | 56 |
| Pot life (geltimer) | min | 48 | 55 |
| Shore A (7days) |  | 70 | 73 |
| Shore D (7 days) |  | 24 | 20 |

What is claimed is:

1. A vegetable oil based polyol, comprising

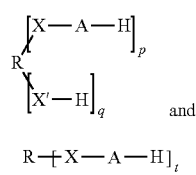 (I)

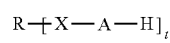 and $$R\!-\!\!+\!X\!-\!A\!-\!H]_t \quad (II)$$

where

R is a residue of a polyol, polyamine or aminoalcohol initiator, wherein the initiator is a compound comprising at least one alcohol or amine group that has been reacted with an alkoxylating agent so that R comprises polyether groups and has a number average molecular weight of at least about 625;

X and X' may be the same or different and is O, N or NH; p is an integer from 1 to 5; q is an integer from 1 to 5 wherein p+q is from 2 to 8, t is an integer from 2 to 8 and A may be the same or different and is selected from the group consisting of A1, A2 and A3 where

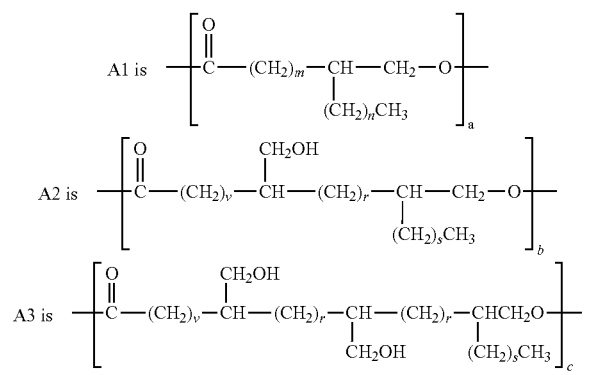

where m, n, v, r, s, a, b and c are integers and m is greater than 3, n greater than or equal to zero and m+n is from 11 to 19, v is greater than 3, r is greater than or equal to zero, s is greater than or equal to zero, and v+r+s is from 10 to 18, a is from 0 to 35, b is from 0 to 35, and c is greater than 0 and less than 35, wherein the amount of A3 is at least 0.05 weight percent of the vegetable oil based polyol, and wherein (a+b+c)/(p+q+t) is greater than 0 and up to about 100 in the vegetable oil based polyol.

2. The vegetable oil based polyol of claim 1 wherein (a+b+c)/(p+q+t) is about 0.5 to 50.

3. The vegetable oil based polyol of claim 2 wherein (a+b+c)/(p+q+t) is about 1 to 25.

4. The vegetable oil based polyol of claim 1 wherein the initiator has a secondary hydroxyl group.

5. The vegetable oil based polyol of claim 1 wherein the initiator is glycerol where at least one of the alcohol groups of the glycerol has been reacted with ethylene oxide or propylene oxide.

6. The vegetable oil based polyol of claim 1 wherein the initiator is selected from the group consisting of neopentylglycol; 1,4-cyclohexane diol; 2,5-hexanediol; 1,2-propylene glycol; trimethylolpropane; pentaerythritol; sorbitol; sucrose; glycerol; 1,6-hexanediol; 1,4-butanediol; ethylene glycol; diethylene glycol; triethylene glycol; bis-3-aminopropyl methylamine; ethylene diamine; diethylene triamine; 9(1)-hydroxymethyloctadecanol; 1,4-bishydroxymethylcyclohexane; 8,8-bis (hydroxymethyl)tricyclo [5,2,1,0$^{2,6}$] decene; Dimerol alcohol; hydrogenated bisphenol; 9,9(10, 10)-bishydroxymethyloctadecanol; 1,2,6-hexanetriol; wherein at least one of the alcohol or amine groups present therein has been reacted with ethylene oxide, propylene oxide or mixture thereof; and combination thereof.

7. The vegetable oil based polyol of claim 1 wherein the vegetable oil based polyol is a liquid and has a weight average molecular weight of at least 1500.

8. The vegetable oil based polyol of claim 7 wherein the weight average molecular weight is at least about 1800.

9. A polyurethane comprised of the reaction product of a polyisocyanate and the vegetable oil based polyol of claim 1.

10. A vegetable oil based polyol comprised of

 (I)

 and $$R\!-\!\!+\!X\!-\!A\!-\!H]_t \quad (II)$$

where

R is a residue of a polyol, polyamine or aminoalcohol initiator;

X and X' may be the same or different and is O, N or NH; p is an integer from 1 to 5; q is an integer from 1 to 5 wherein p +q is from 3 to 8, t is an integer from 3 to 8 and A may be the same or different and is selected from the group consisting of A1, A2 and A3 where

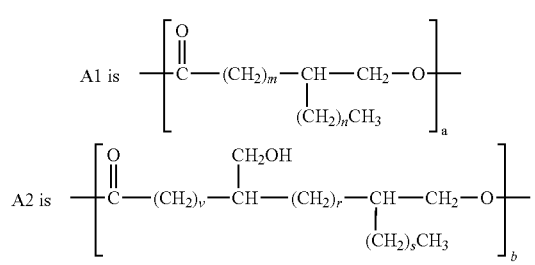

A3 is 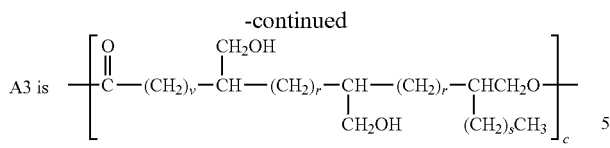

where m, n, v, r, s, a, b and c are integers and m is greater than 3, n greater than or equal to zero and m+n is from 11 to 19, v is greater than 3, r is greater than or equal to zero, s is greater than or equal to zero and v+r+s is from 10 to 18, a is above 0 and less than 35, b is above 0 and less than 35 and c is above 0 and less than 35, so long as A1 has a weight ratio of between about 10 and about 95 weight percent of the total weight of A1+A2+A3, A2 has a weight ratio of between about 1 and about 65 weight percent of the total weight of A1+A2+A3, A3 has a weight ratio of between about 0.1 and about 10 weight percent of the total weight of A1+A2+A3, and the weight ratio of A2 to A3 is greater than 5/1.

11. The vegetable oil based polyol of claim 10 wherein at least a portion of the vegetable oil based polyol has a structure

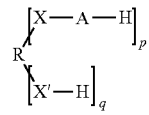

where at least one X'—H group is a primary hydroxyl or primary amine and at least one X-A-H group is located at a position corresponding to a secondary hydroxyl or secondary amine of the initiator.

12. The vegetable oil based polyol of claim 11 wherein at least a portion of the vegetable oil based polyol has a structure:

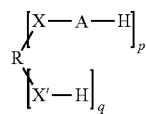

where all of the X'—H groups are a primary hydroxyl or primary amine and all of the X-A-H groups are located at a position corresponding to a secondary hydroxyl or secondary amine of the initiator.

13. The vegetable oil based polyol of claim 12 wherein the initiator is glycerol where at least one of the alcohol groups of the glycerol has been reacted with ethylene oxide or propylene oxide.

14. The vegetable oil based polyol of claim 12 wherein the initiator is selected from the group consisting of neopentylglycol; 1,4-cyclohexane diol; 2,5-hexanediol; 1,2-propylene glycol; trimethylolpropane; pentaerythritol; sorbitol; sucrose; glycerol; 1,6-hexanediol; 1,4-butanediol; ethylene glycol; diethylene glycol; triethylene glycol; bis-3-aminopropyl methylamine; ethylene diamine; diethylene triamine; 9(1)-hydroxymethyloctadecanol; 1,4-bishydroxymethylcyclohexane; 8,8-bis (hydroxymethyl)tricyclo [$5,2,1,0^{2,6}$] decene; Dimerol alcohol; hydrogenated bisphenol; 9,9(10,10)-bishydroxymethyloctadecanol; 1,2,6-hexanetriol; wherein at least one of the alcohol or amine groups present therein has been reacted with ethylene oxide, propylene oxide or mixture thereof; and combination thereof.

15. The vegetable oil based polyol of claim 10 wherein the vegetable oil based polyol is a liquid and has a weight average molecular weight of at least 1500.

16. The vegetable oil based polyol of claim 15 wherein the weight average molecular weight is at least about 1800.

17. A polyurethane comprised of the reaction product of a polyisocyanate and the vegetable oil based polyol of claim 11.

* * * * *